U S005400036A

United States Patent [19]

Kochiyama et al.

[11] Patent Number: 5,400,036
[45] Date of Patent: Mar. 21, 1995

[54] ENERGY TRANSMISSION ARRANGEMENT

[75] Inventors: Jiro Kochiyama, Koshigaya; Nobuyuki Kaya, No. 1-1, Rokkodai-cho, Nada-ku, Kobe City, Hyogo Prefecture; Teruo Fujiwara, Hoya; Hidemi Yasui, Musashino; Hiroyuki Yashiro, Tokyo, all of Japan

[73] Assignees: Nissan Motor Co., Ltd., Yokohama; Nobuyuki Kaya, Kobe, both of Japan

[21] Appl. No.: 128,286

[22] Filed: Sep. 29, 1993

[30] Foreign Application Priority Data

Sep. 29, 1992 [JP] Japan .................................. 4-259205

[51] Int. Cl.[6] ........................ H01Q 1/00; H04B 7/185
[52] U.S. Cl. ..................................... 342/370; 342/354
[58] Field of Search ................ 342/370, 354; 136/292; 322/2 R

[56] References Cited

U.S. PATENT DOCUMENTS 3,611,381 10/1971 Preikschat et al. .................. 342/370
4,148,031 4/1979 Tausworthe et al. ............... 342/370

OTHER PUBLICATIONS

Asahi Newspaper, morning edition 13, Jul. 4, 1992, p. 15.

Primary Examiner—Gregory C. Issing
Attorney, Agent, or Firm—Lowe, Price, LeBlanc & Becker

[57] ABSTRACT

An energy transmission arrangement emits a microwave energy signal to a target location on the basis of a pilot signal received from the target location. The arrangement includes a plurality of pilot antennas for receiving the pilot signal and a plurality of antenna elements for transmission of the energy signal. The pilot signal as received at a first pilot antenna is multiplied at a phase conjugation circuit and divided into a plurality of transmission signals corresponding to the plurality of antenna elements. A target direction is calculated based on a phase difference of the pilot signal as received at each of the other pilot antennas and a phase adjustment circuit is provided for adjusting the phases of each of the transmission signals on the basis of the calculated target direction. Electrical energy is then supplied from energy collecting means to a plurality of amplifiers and amplified respectively, on the basis of a corresponding one of the transmission signals, to be supplied to respective antenna elements to be emitted as the microwave energy signal. According to this arrangment, the phase conjugation circuit is active to receive the pilot signal as received at the first pilot antenna as well as the pilot signal as received at a predetermined reference point in the path of the pilot signal for calculating a difference signal for effecting phase correction of the microwave energy signal.

6 Claims, 7 Drawing Sheets

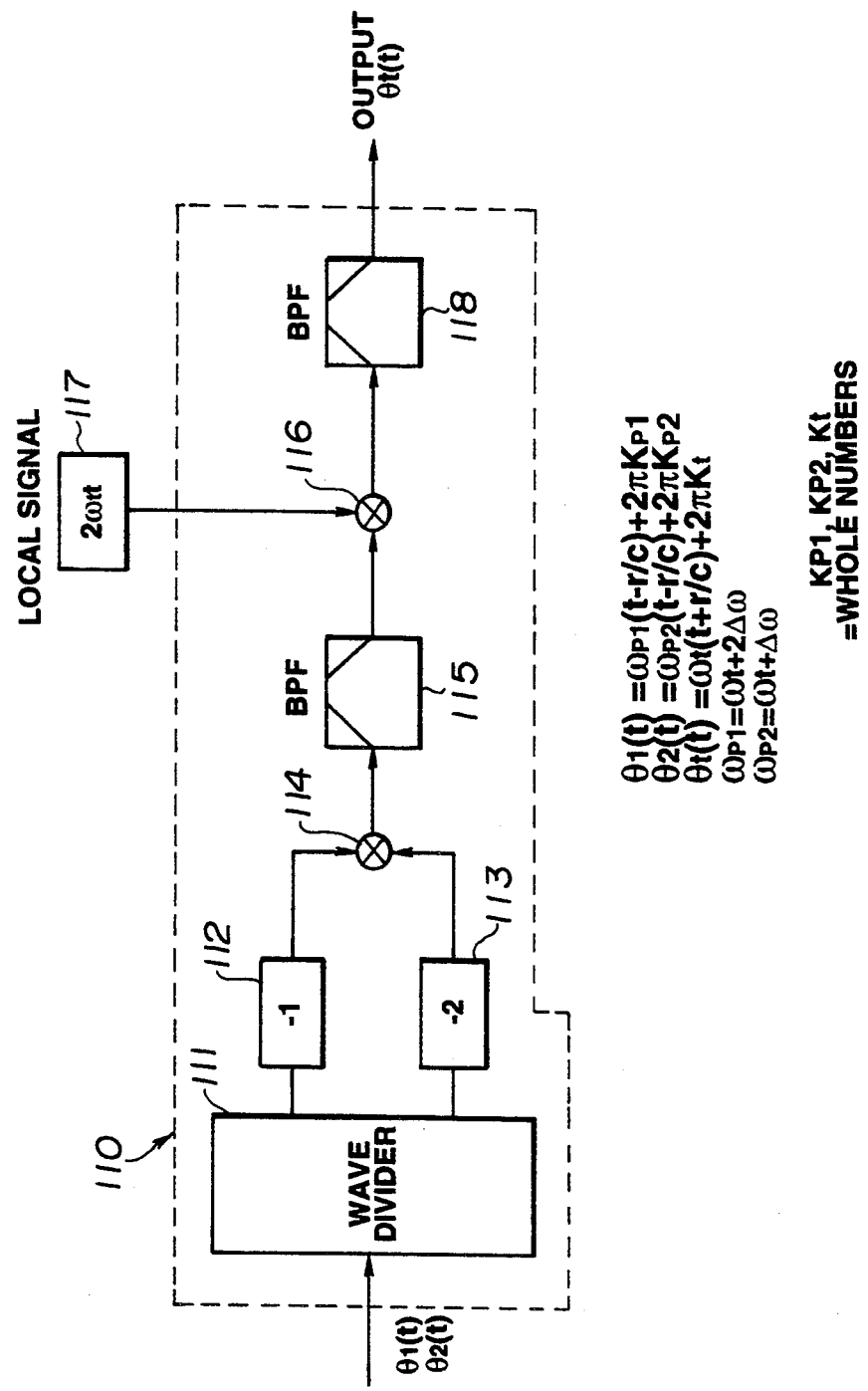

ENERGY TRANSMISSION ARRANGEMENT

BACKGROUND OF THE INVENTION

1. Field of The Invention

The present invention relates generally to a receiving and transmitting arrangement. Particularly, the present invention relates to a method of transmitting electrical energy collected from a solar energy source to a remote target location from which a pilot signal is received.

2. Description of The Prior Art

Solar Power Satellites (SPS) have recently been proposed for collecting solar electrical energy and transmitting same to be received and utilized at remote locations. The collected energy would be transmitted as a microwave signal to, for example, an orbital space station, factory, or a location on earth or another celestial body. For establishing such as system of energy transfer, efficient receiving and transmission elements are required.

One such system of solar energy collection/transmission has been described in the Jul. 14, 1992 issue of the Asahi Newspaper, morning edition 13, page 15. FIG. 6 shows a representation of the described arrangement. Referring to the drawing, an earth launched solar energy collection/transmission satellite 101 is shown. The satellite is adapted to transmit solar energy in a direction from which a microwave pilot signal, aimed at the satellite from a remote location, is received.

For realizing such an energy transmission arrangement, for guiding an energy transmission wave and phase control of a generated microwave signal , a microwave pilot signal is emitted from a target point and the energy transmission arrangement must be active to transmit electrical energy back in a target direction from which the pilot signal is received. This has been attempted via phased array antennas and 'retrodirective' transmission methods.

Referring to FIG. 7, such a retrodirective method as mentioned above will be explained. First, a pilot signal is emitted at a given frequency $\omega_i$ toward the position of the energy transmission arrangement (i.e. a satellite, not shown in the drawing), from a target point A. The pilot signal is received at a plurality of antenna elements (not shown) of the energy transmission arrangement. In response to reception of the pilot signal, the energy transmission arrangement emits an energy transmission wave at a given frequency $\omega_t$, in the direction of the target point A. At a time t, when the energy transmission wave arrives at the target point A, a distance $X_0$ is assumed to separate the target point A from a reference point $P_0$ on the energy transmission arrangement. At this, a phase of the pilot signal in relation to the reference point $P_0$ may be expressed as:

$$\phi_0 = \omega_i(t_0 - X_0/C) \quad (1)$$

wherein C=the speed of light.

In the same way, since the target point A separated from a different point, $P_1$, on the energy transmission arrangement by an distance $X_1$, a phase of the pilot signal may be expressed as:

$$\phi_1 = \omega_i(t_0 - X_1/C) \quad (2)$$

At this, a phase difference between the two points ($P_0$, $P_1$), may be expressed as:

$$\Phi_i = \phi_1 - \phi_0 = -\omega_i r/C \quad (3)$$

wherein $r = X_1 - X_0$.

Provisionally, if the transmission wave is emitted at same phase from both points $P_0$ and $P_1$, a phase difference in relation to the target point A is present in the frequency $\omega_t$ of the transmission wave. Relating to the condition noted from equation (3) the phase difference of the transmission wave may be expressed as:

$$\Phi_t = -\omega_t r/C \quad (4)$$

At this, while a phase of the transmission wave from the two points $P_0$ and $P_1$ are similar, a correction for the phase of the point $P_1$ may be expressed as:

$$\Phi_c = \omega_t r/C \quad (5)$$

According to this, phase correction for any number of emission points of the energy transmission arrangement may be effected according to the equation (5). Thus, the phase of emissions of the transmission wave from any point of the energy transmission arrangement can be converged at the target point A, the above being based on the general principles of the retrodirective method.

In applying the above transmission method to a solar energy transmission arrangement having a plurality of transmission antenna elements, a phase conjugation circuit is required for the received pilot signal for effecting retrodirective operation. According to this, an enormous quantity and weight may be accrued as the transmission antenna 'subarray' is divided into a given number of blocks. Each block of the subarray must have its own pilot signal receiving apparatus and phase conjugation circuit. Also, each block of the subarray must have a voltage supply of the same phase for the transmission antenna elements. Since the microwave pilot signal emitted from the target is of substantially high voltage, and the frequency of the pilot signal is identical to the frequency of the energy transmission wave (also a microwave signal), it is difficult for the receiving apparatus of the energy transmission arrangement to extract the received pilot signal from the broadcast transmission wave. As applied to a solar energy transmission arrangement, for example, Mitsubishi Electronics proposes an asymmetric two frequency method in an article entitled 'Microwave Transmission Antenna Beam Control Voltage' (1988).

Referring to FIG. 8, according to such an asymmetric two frequency method as set forth in the above-mentioned document, a phase conjugation circuit 110 is provided. This phase conjugation circuit 110 includes a wave divider device 111, which divides a pilot signal received by a solar energy transmission satellite (i.e. satellite 101 of FIG. 6) into a first phase a $\theta_1(t)$ and a second phase $\theta_2(t)$. The first phase signal $\theta_1(t)$ is output from the wave divider device 111 to a first multiplier 112 while the second phase signal $\theta_2(t)$ is output to a second multiplier 113. The first multiplier 112 multiplies the output of the wave divider 111 by $-1$, while the second multiplier 113 multiplies the output of the wave divider 111 by 2. After this, the outputs of the first and second multipliers 112 and 113 are input to a first mixer 114 where the $-1$ multiplied first phase signal $\theta_1(t)$ and the 2 multiplied second phase signal $\theta_2(t)$ are combined. The output of the mixer 114 is then input to a first band pass filter 115. From the mixer 114, via the band pass filter, either of a combined sum signal or difference signal are input to a second mixer 116. The second mixer 116 further receives a local signal 2ωtt of the same frequency as the pilot signal and, after combining this signal with the output of the first bandpass filter 116, outputs a combined signal to a second band pass filter 118. An output ωt(t) of the second bandpass filter 118 is then output from the phase conjugation circuit 110 to be sent to the antenna elements of the solar energy transmission satellite.

In the above-described solar energy transmission arrangement, beam control of the units of the subarray is adopted according to the retrodirective method. However, according to this arrangement, directional scanning within the microwave beam cannot be accomplished. Thus, if wide angle scanning of the microwave beam is to be accomplished, the size of the subarray must be limited to a relatively small size. Further, each subarray must be fitted with a conjugation circuit in order for the arrangement to function correctly.

For implementing such a conjugation circuit for the above asymmetric two frequency arrangement, circuit design and implementation becomes complex and costly as provision of such a asymmetric two frequency conjugation circuit for each antenna element is impractical. Thus it has been required to provide an electrical energy transmission system which may provide wide angle beam scanning with simple structure.

SUMMARY OF THE INVENTION

It is therefore a principal object of the present invention to overcome the drawbacks of the prior art.

It is a further object of the present invention to provide an energy transmission arrangement in which wide angle beam scanning can be accomplished and retrodirective transmissions may be executed with an arrangement which is simplified in design and reduced in weight and cost.

In order to accomplish the aforementioned and other objects, an energy transmission arrangement is provided, wherein electrical energy is converted to a microwave energy signal for transmission to a target location remote from the energy transmission arrangement, a phase of the microwave energy signal being controlled on the basis of a pilot signal emitted from the target location and received at a plurality of pilot antennas, the microwave energy signal being emitted in a direction from which the pilot signal has been received via a plurality of transmission antenna elements, comprising: phase conjugation means at which the pilot signal received at a first pilot antenna is multiplied n times, dividing means, receiving the output of the phase conjugation means to be divided into a plurality off shift signals corresponding to a number of the transmission antenna elements, angle detecting means, receiving the pilot signal via the others of the plurality of pilot antennas, and detective of an arrival direction of the pilot signal on the basis of a phase difference in the pilot signal as received at each of the other pilot antennas, processing means calculating a phase adjustment value based on the output of the angle detecting means, a plurality of phase adjusting means, setting a phase of each shift signal output from the dividing means on the basis of the phase adjustment value calculated by the processing means so as to establish a transmission direction for each of the antenna elements and outputting a directional signal indicative thereof, a plurality of amplifier means each receiving a directional signal output from a corresponding one of the phase adjusting means and further receiving the electrical energy and, amplifying the electrical energy according to the directional signals for establishing the microwave energy signal, the microwave energy signal being output from each of the amplifier means and supplied to a respective one of the antenna elements to be emitted in the transmission direction, the phase conjugation means including means for obtaining a difference signal based on the pilot signal input thereto from the first pilot antenna and a common pilot signal received at a reference point within the pilot signal for effecting phase correction of an output of the phase conjugation means.

According to another aspect of the invention, an energy transmission method is provided, comprising the steps of: receiving a microwave pilot signal at a first frequency, carrying out phase correction for the received pilot signal on the basis of a phase difference existing between the pilot signal as received at a predetermined reference point and as received at another reception point and multiplying the signal to establish a second frequency, dividing the signal n times after phase correction for providing a plurality of output signals, determining an angle of the received pilot signal on basis of a phase difference existing between the pilot signal as received at a plurality of reception points and calculating a target direction on the basis thereof, adjusting the phase of each of the plurality of output signals on the basis of the calculated target direction, amplifying electrical energy to be transmitted on the basis of the output signals, and emitting the electrical energy at the second frequency.

BRIEF DESCRIPTION OF THE DRAWINGS

In the drawings:

FIG. 8 is a block diagram of a conventional phase conjugation circuit.

DESCRIPTION OF THE PREFERRED EMBODIMENT

Figure 1:
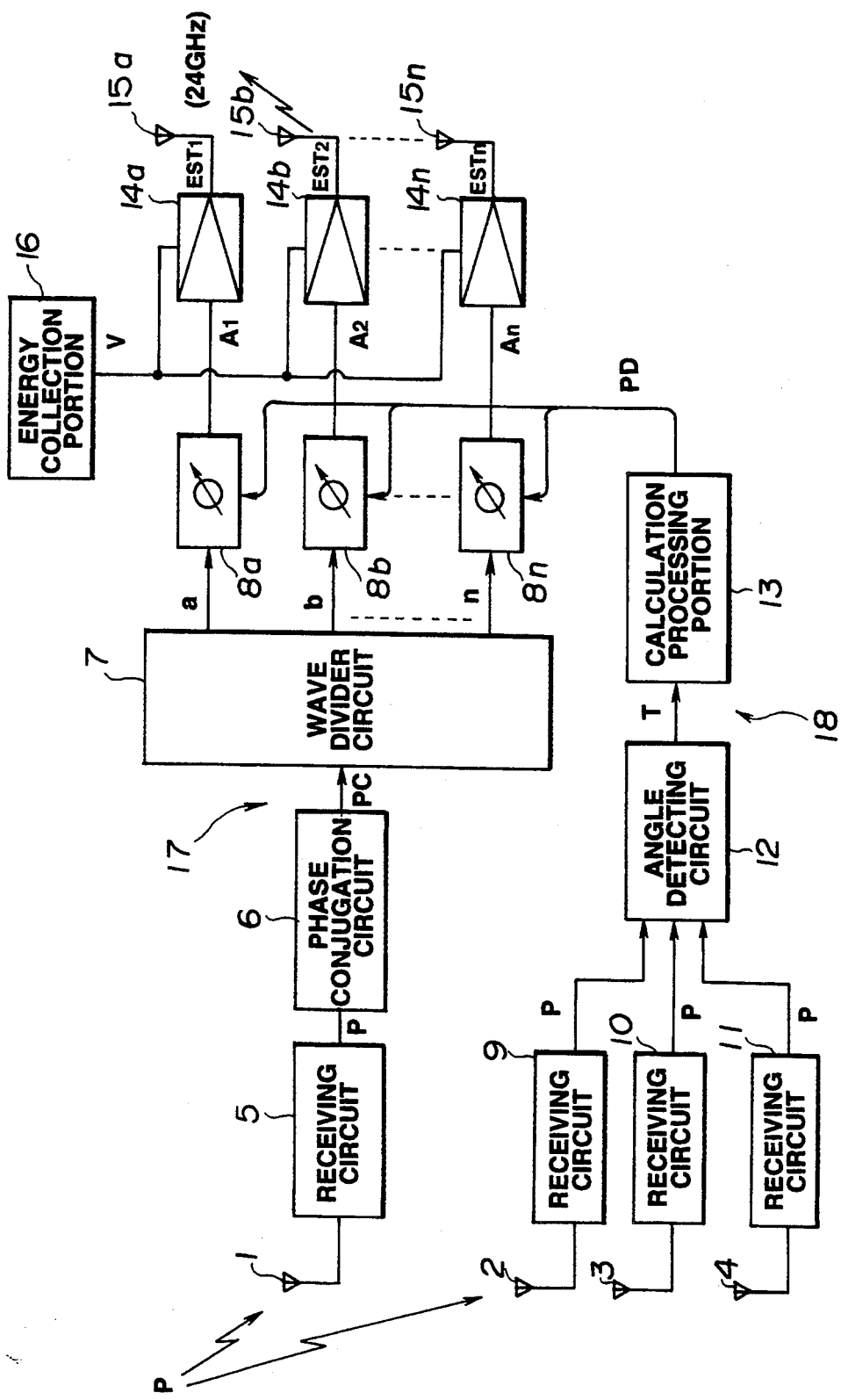
FIG. 1 is a block diagram showing a circuit layout for a solar energy receiving/transmitting system.

Referring now to the drawings, particularly to FIG. 1, a block diagram of the circuit arrangement of the solar energy transmission arrangement of the invention is shown. Referring to the drawing, it may be seen that a group of four pilot antennas 1, 2, 3, 4 are provided, the four pilot antennas 1–4 being provided for each subarray block provided. As may be seen in FIG. 1 the first pilot antenna 1 is receivable of a pilot signal P of a frequency of, for example, 8 GHz. The pilot signal P is then received by a receiving circuit 5 to be forwarded to a phase conjugation circuit 6 where the signal is multiplied (i.e. ×3). The output of the phase conjugation circuit 6 is input to a wave divider circuit 7 where the signal is divided n times. That is, the pilot signal P is divided at the wave divider circuit 7 which outputs a plurality of shift signals a-n which are received by a corresponding plurality of phase shift devices $8a$-$8n$. On the other hand, the other pilot antennas 2, 3 and 4 receive the pilot signal P and output same to respective receiving circuits 9, 10 and 11, the outputs of which are collectively input to an angle detecting circuit 12, which may be, for example, an RF interference type angle detecting circuit.

At the angle detecting circuit 12, a phase difference between the pilot signal P as received by each of the pilot antennas 2-4 is used for calculating a target direction angle signal T. The target direction angle signal T is then input to a calculation processing portion 13, which may be a microcomputer or the like. The output of the calculation processing portion 13 is dependent on the incoming target direction angle signal T such that a phase difference signal PD supplied from the calculation processing portion to the phase shift devices $8a$-$8n$, is used to vary the phases of the respective signals a-n output from the wave divider circuit 7 for affecting a phase of emission of respective microstrip antenna elements $15a$-$15n$, so that energy transmission microwave signals $ETS_1$, $ETS_2$ ... $ETS_n$ emitted by the respective microstrip antenna elements $15a$-$15n$ converge in the target direction detected by the angle detecting circuit 12.

As noted above, the phase shift devices $8a$-$8n$ respectively receive a phase difference signal PD from the calculation processing portion 13 and respective shift signals a-n from the wave dividing circuit 7. The phase shift devices $8a$-$8n$ respectively output aiming signals $A_1$, $A_2$ ... $A_n$ to a corresponding plurality of voltage amplifiers $14a$-$4n$, one microstrip antenna element 15 being provided respectively for each of the voltage amplifiers 14. The voltage amplifiers $14a$-$14n$ also receive an electrical potential V output from a solar energy collection portion 16 and amplification of the electrical potential V is carried out on the basis of the phases of the respective aiming signals $A_1$, $A_2$ ... $A_n$. The output of the voltage amplifiers $14a$-$14n$ is output to the microstrip antenna elements $15a$-$15n$ for transmission as the energy transmission microwave signal ETS, at a frequency of 24 GHz, in the target direction.

The above circuit arrangement is comprised essentially of a phase control portion which includes the receiving circuit 5, the phase conjugation circuit 6, the wave divider circuit 7 and the phase shift circuits $8a$ .. . $8n$; and a signal processing portion 18 which includes the three pilot antennas 2, 3, and 4, the receiving circuits 9, 10 and 11 and the angle detecting circuit 12 as well as the calculation processing portion 13.

Figure 2:
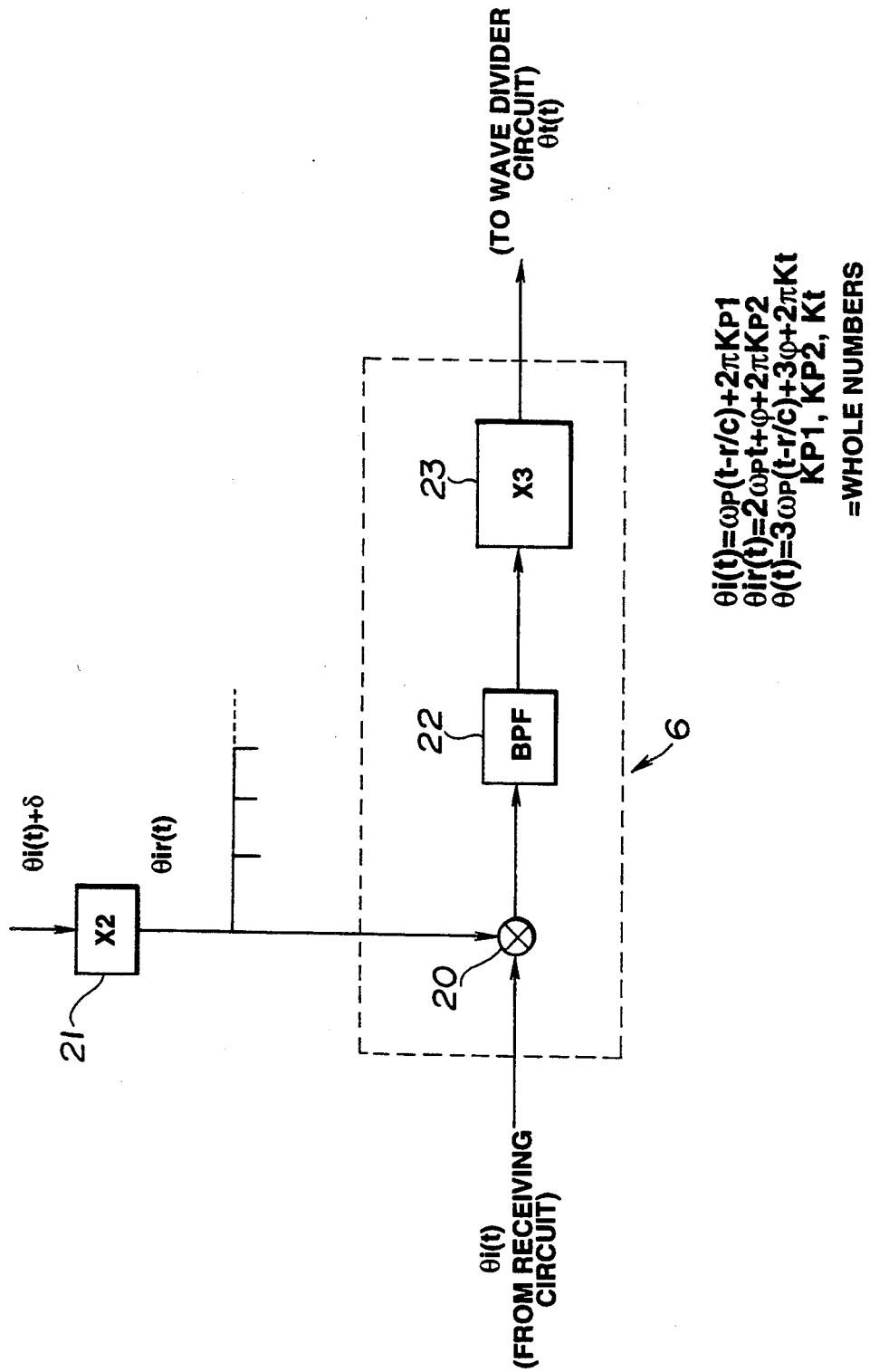
FIG. 2 is a block diagram of a phase conjugation circuit according to the energy transmission arrangement of FIG. 1.

Referring now to FIG. 2, a phase conjugation circuit 6 according to the present embodiment of the invention will be described in detail. As may be seen in the drawing, the phase conjugation circuit 6 includes a mixer 20 which receives the pilot signal P ($\theta i(t)$) from the pilot antenna 1 via the receiving circuit 5 and further receives a signal $\theta ir(t)$ which is the output of a ×2 multiplier which receives an input $\theta i(t) + \delta$ which is derived from the pilot signal as received at the reference point $P_0$ in the path of the pilot signal. The mixer 20 then outputs a sum signal and a difference signal to a bandpass filter 22. The bandpass filter 22 passes the difference signal only as a phase correction component and the output is sent to a ×3 multiplier 23 where the frequency of the phase corrected signal is multiplied by 3 and output to the wave divider circuit 7. Thus, basically, phase correction in accordance with the retrodirective method is carried out in the phase conjugation circuit 6.

Specifically, for carrying out such phase correction if a phase of a signal input at the reference point $P_0$ is $\omega_i t$ and a phase difference at the point $P_1$ is determined according to the equation (3) above, phase correction may carried out according to the following equation:

$$\phi = \omega_i t - \omega_i r/C \qquad (6)$$
$$= \omega_i(t - r/C)$$

For determining an output from the point $P_1$ after phase correction according to equation (5) the following formula must be applied:

$$\phi = \omega_i t + \omega_i r/C \qquad (7)$$
$$= \omega_i(t + r/C)$$

Thus, the phase conjugation circuit 6 accepts an input signal according to the equation (6) and converts the input to an output signal according to equation (7).

Figure 3:
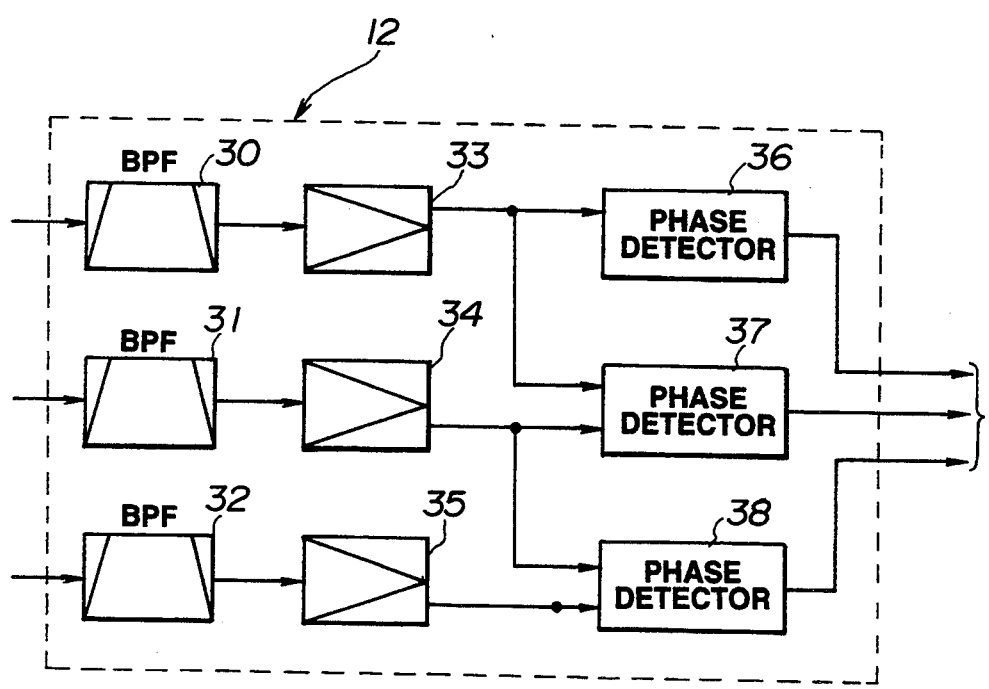
FIG. 3 is a block diagram of an angle detecting circuit according to the energy transmission arrangement of FIG. 1.

Referring now to FIG. 3, an angle detecting circuit according to the present embodiment will be explained in detail.

As may be seen in the drawing, the angle detecting circuit comprises three bandpass filters 30, 31 and 32 respectively receiving inputs from the pilot antennas 2, 3 and 4 via the receiving circuits 9, 10 and 11. The output of the bandpass filters 30-32 is output to respective amplifiers 33, 34 and 35. The outputs of the amplifiers 33-35 are input to phase detecting circuits 36, 37 and 38. The phase difference of the pilot signals received at the pilot antennas 2, 3 and 4 is output from the calculation processing portion 13 (FIG. 1).

Figure 4:
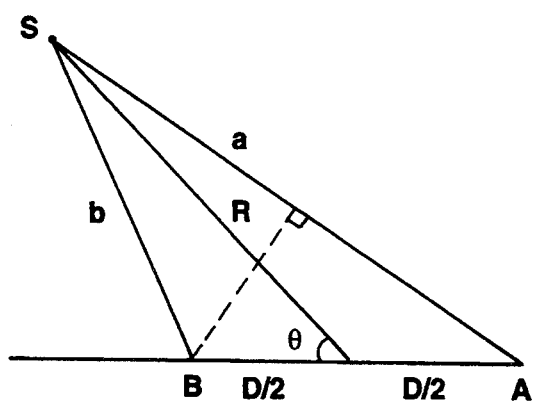
FIG. 4 is an explanatory diagram for explaining calculation of an angle of a received pilot signal.

The principle of the angle detecting circuit 12 is that the angle of the arrival direction of the signal may be measured by the phase difference in a wave input at two points above a point on a base line (pilot antennas 2, 3, 4). Referring to FIG. 4, a phase difference=$\phi$, AB is a base line, S is a target, R, a, b, and D are distances as labeled in the drawing, and $\lambda$ is a wavelength. Thus, with reference to the following equations:

$$\phi = 2\pi(a-b)/b^2 = (D/2)2 + R^2 - DR \cos \theta \qquad (8)$$

$$a^2 = (D/2)2 + R^2 - DR \cos \theta a^2 - b^2 = 2DR \cos \theta a - b = DR \cos \theta \{2R/(a+b)\} \qquad (9)$$

it may be seen that, if $R > D$, b is nearly equivalent to D ($2R = a + b$). At this, the following condition is present:

$$a - b = D \cos \theta$$

Therefore, a condition manifests as set forth in the following equation:

$$\cos \theta = (a-b)/D = \phi\lambda/2\pi D \qquad (10)$$

Since, if the length of the base line D is already known, the wavelength is known also, the angle of a signal from the target S may be assumed.

Figure 5:
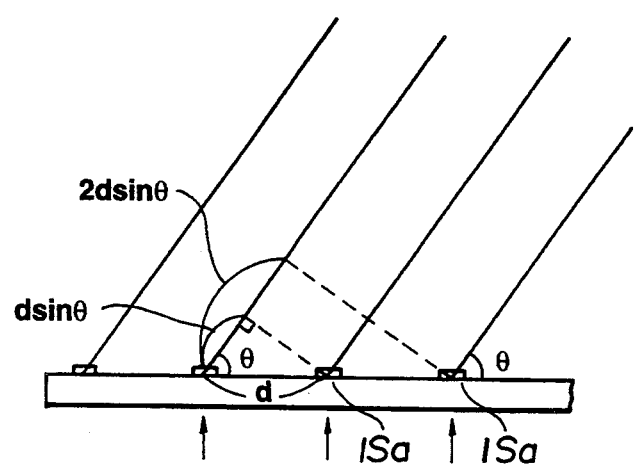
FIG. 5 is an explanatory diagram explaining calculation of a wavelength of a transmission signal.
Figure 6:
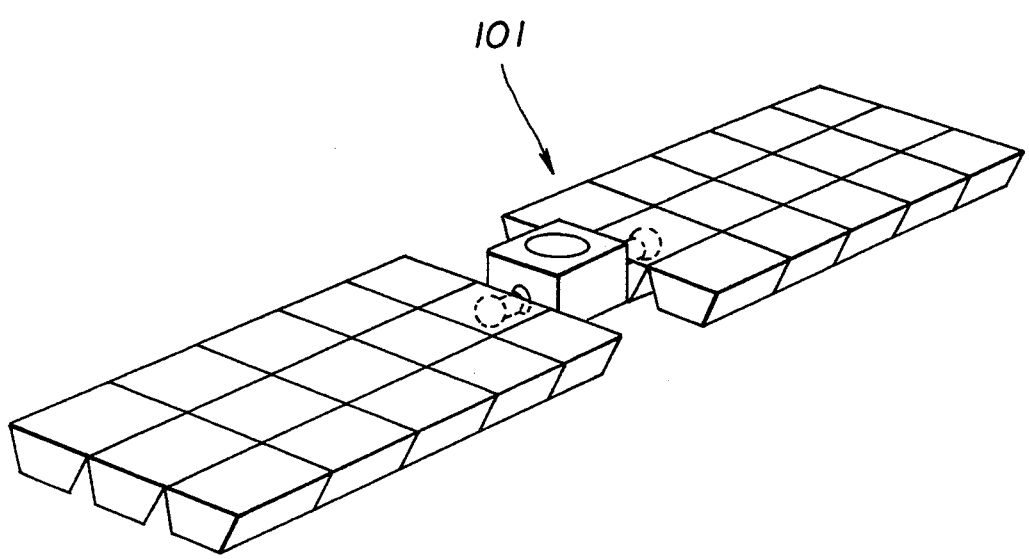
FIG. 6 is a perspective view of a proposed solar energy receiving/transmitting satellite.
Figure 7:
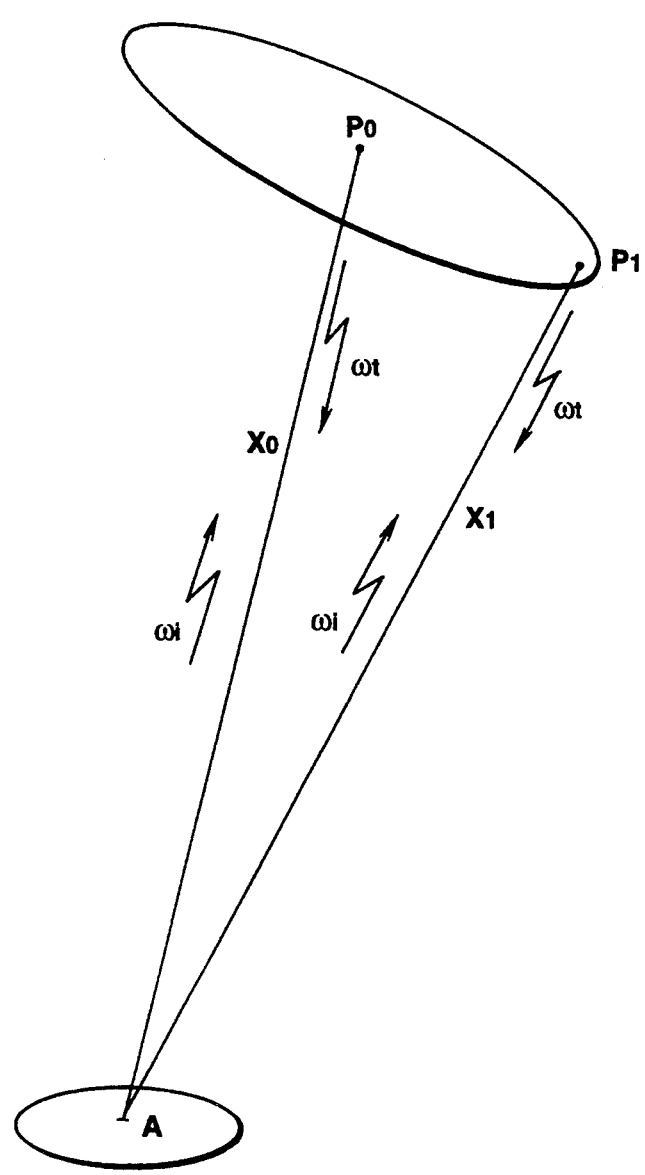
FIG. 7 is an explanatory diagram of a known retrodirective transmission method.

Referring to FIG. 5, since phase correction, of the ankle from which the pilot signal P from the target S is received, is calculated in the calculation processing portion 13 a phase difference $d\sin\theta$ may be applied to each of the transmission antenna elements 15 and emission of the energy transmission microwave signal ETS in phase with a receiving antenna at the target S may be accomplished.

Thus, according to the above arrangement, even if a large directional shift occurs, the phase of transmission will be assured of excellent reception efficiency at the receiving antenna (not shown) of the target S.

Further, according to the above-described embodiment, since the pilot signal received by the pilot antenna 1 as well as at a reference point $P_0$ are input to the phase conjugation circuit 6, the difference signal is sufficient for calculating correction and no local signal is necessary. Further, since no accumulator circuits are required for the above arrangement, construction is simplified and weight is reduced.

It will also be noted that, according to the invention, since the pilot signal frequency is in relation to the microwave frequency by a factor of 1/n, only signals without irregularity will be received. Further, since the receiving circuits 5 and 9, 10, 11 may comprise common bandpass filters in series with amplifiers, construction is further simplified. With the above noted simplified construction, an overall weight of the energy transmission arrangement is further reduced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An energy transmission arrangement, wherein electrical energy is converted to a microwave energy signal for transmission to a target location remote from said energy transmission arrangement, a phase of said microwave energy signal being controlled on the basis of a pilot signal emitted from said target location and received at a plurality of pilot antennas, said microwave energy signal being emitted in a direction from which said pilot signal has been received via a plurality of transmission antenna elements, comprising:

phase conjugation means at which said pilot signal received at a first pilot antenna is multiplied n times;

dividing means, receiving the output of said phase conjugation means to be divided into a plurality of shift signals corresponding to a number of said transmission antenna elements;

angle detecting means, receiving said pilot signal via the others of said plurality of antennas, and detective of an arrival direction of said pilot signal on the basis of a phase difference in said pilot signal as received at each of said other pilot antennas;

processing means calculating a phase adjustment value based on the output of said angle detecting means;

a plurality of phase adjusting means, setting a phase of each shift signal output from said dividing means on the basis of said phase adjustment value calculated by said processing means so as to establish a transmission direction for each of said antenna elements and outputting a directional signal, indicative thereof;

a plurality of amplifier means each receiving a directional signal output from a corresponding one of said phase adjusting means and further receiving said electrical energy and, amplifying said electrical energy according to said directional signals for establishing said microwave energy signal, said microwave energy signal being output from each of said amplifier means and supplied to a respective one of said antenna elements to be emitted in said transmission direction;

said phase conjugation means including means for obtaining a difference signal based on said pilot signal input thereto from said first pilot antenna and a common pilot signal received at a reference point within said pilot signal for effecting phase correction of an output of said phase conjugation means.

2. An energy transmission arrangement as set forth in claim 1, further including collection means such that said electrical energy is collected in the form of solar energy for conversion into said microwave energy signal.

3. An energy transmission arrangement as set forth in claim 1, wherein said arrangement is a satellite.

4. An energy transmission method, comprising the steps of:

receiving a microwave pilot signal at a first frequency;

carrying out phase correction for the received pilot signal on the basis of a phase difference existing between the pilot signal as received at a predetermined reference point and as received at another reception point and multiplying said signal to establish a second frequency;

dividing said signal n times after phase correction for providing a plurality of output signals;

determining an angle of the received pilot signal on the basis of a phase difference existing between the pilot signal as received at a plurality of reception points and calculating a target direction on the basis thereof;

adjusting the phase of each of said plurality of output signals on the basis of said calculated target direction;

amplifying electrical energy to be transmitted on the basis of said output signals; and emitting said electrical energy at said second frequency.

5. An energy transmission method as set forth in claim 4, further including a step of collecting said electrical energy.

6. An energy transmission method as set forth in claim 4, further including a step of converting solar energy into said electrical energy.

\* \* \* \* \*